United States Patent [19]

Jacques

[11] Patent Number: 5,507,514
[45] Date of Patent: Apr. 16, 1996

[54] DOCKABLE CONTAINER CHASSIS

[75] Inventor: Charles H. Jacques, Beauceville, Canada

[73] Assignee: Manac, Inc., Beauce, Canada

[21] Appl. No.: 405,747

[22] Filed: Mar. 20, 1995

Related U.S. Application Data

[63] Continuation of Ser. No. 77,671, Jun. 15, 1993, abandoned.

[51] Int. Cl.$^6$ .................................................. B60P 1/00
[52] U.S. Cl. ................................. 280/407.1; 280/411.1; 280/DIG. 8; 414/559; 414/679
[58] Field of Search ........................... 280/405.1, 407.1, 280/408, 411.1, 656, 789, 476.1, 423.1, DIG. 8; 414/349, 352, 498, 500, 559, 576, 679

[56] References Cited

U.S. PATENT DOCUMENTS

| | | | |
|---|---|---|---|
| 1,885,399 | 11/1932 | Wren | 414/500 |
| 2,365,884 | 12/1944 | Kucesa | 280/405.1 X |
| 3,450,285 | 6/1969 | Robinson | 414/500 |
| 4,365,820 | 12/1982 | Rush | 280/476.1 X |
| 4,580,805 | 4/1986 | Bertolini | 280/656 X |
| 4,836,735 | 6/1989 | Dennehy, Jr. et al. | 414/679 X |
| 5,067,740 | 11/1991 | Christenson | 280/405.1 X |
| 5,137,296 | 8/1992 | Forman | 280/407.1 |
| 5,199,732 | 4/1993 | Lands et al. | 280/407.1 |

FOREIGN PATENT DOCUMENTS 0394548  10/1990  European Pat. Off. .............. 414/679

*Primary Examiner*—Margaret A. Focarino
*Assistant Examiner*—Victor E. Johnson
*Attorney, Agent, or Firm*—Foley & Lardner

[57] ABSTRACT

A dockable container chassis has a slidable bunk for carrying the container between transport and docking positions. This chassis may be used as the lead trailer of a "B train" or as a single semi-trailer. When the chassis is the lead trailer, a fifth wheel is mounted at the rear thereof between the chassis sides. The tail trailer is then equipped with a kingpin mounted to connect with the fifth wheel on the rear of the lead trailer, without interference between the chassis of the two units. The bunk on the lead trailer rides over the fifth wheel of the lead trailer which is located between the sides of its chassis. Locking mechanisms are provided to restrain the bunk from movement unless unlocked and the bunk is being moved from the docking to a transport position.

9 Claims, 17 Drawing Sheets

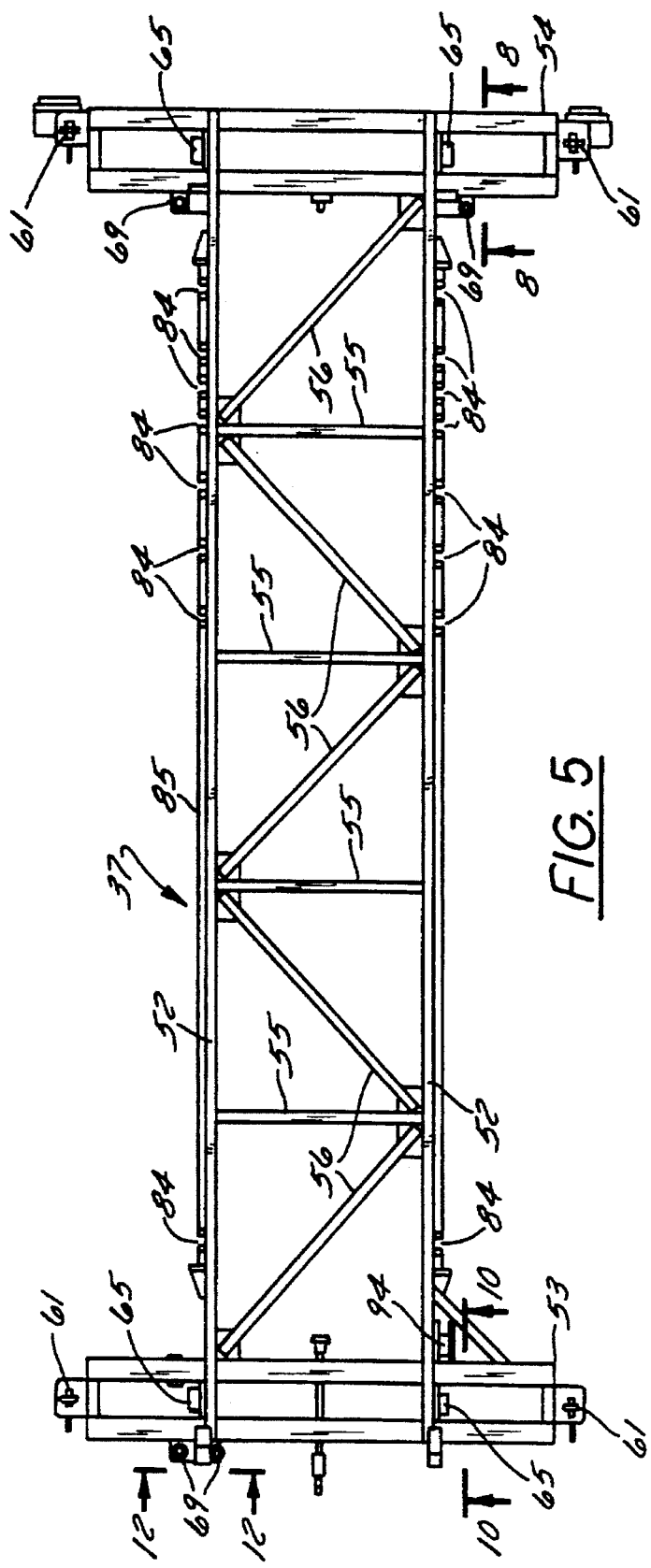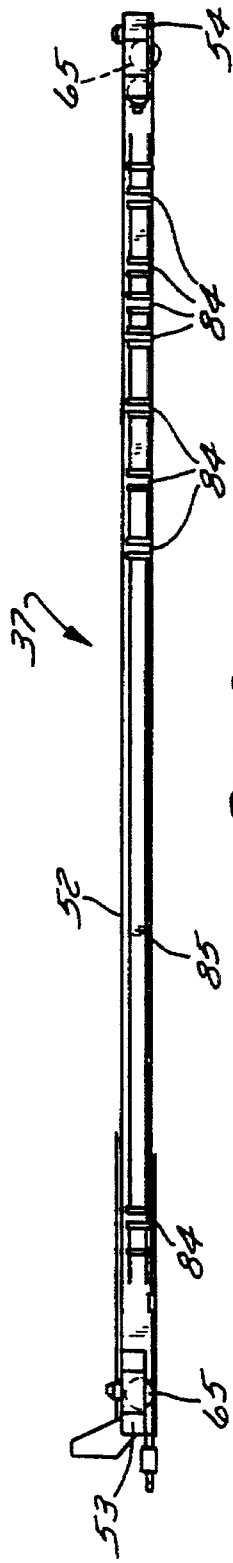

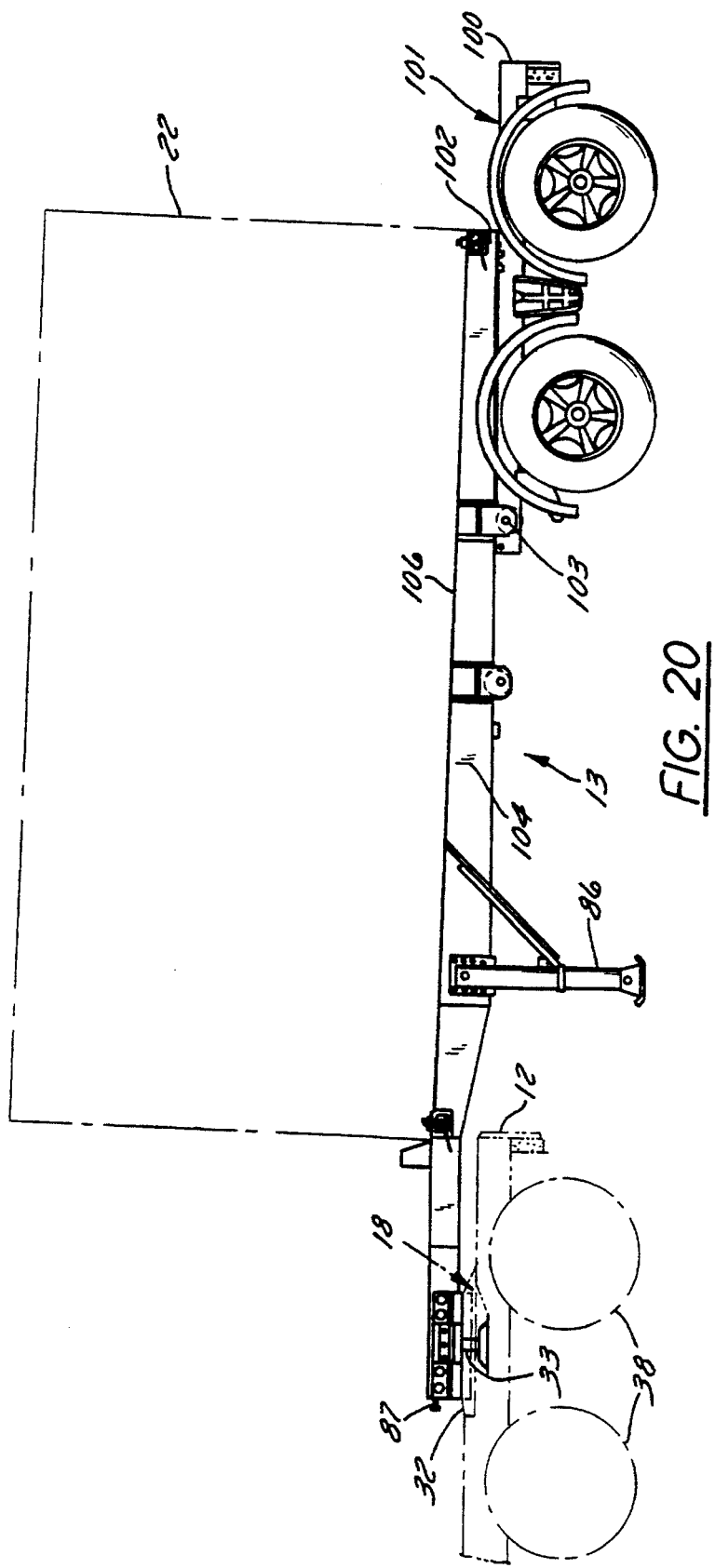
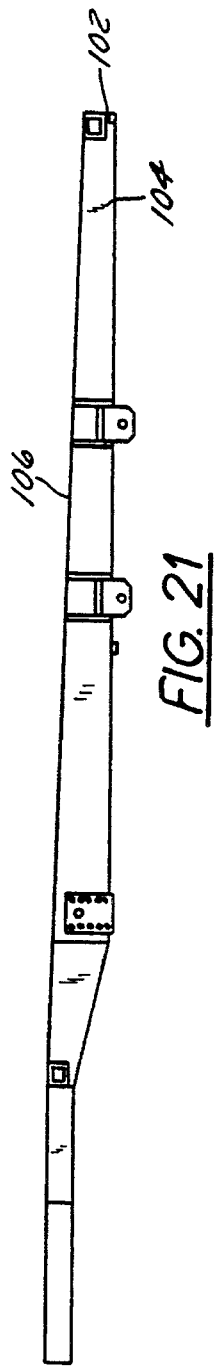
FIG. 20
FIG. 21

DOCKABLE CONTAINER CHASSIS

This is a continuation of U.S. Ser. No. 08/077,671 filed on Jun. 15, 1993, entitled: DOCKABLE CONTAINER CHASSIS, now abandoned.

FIELD OF THE INVENTION

The present invention relates to highway tractor-trailers, and more specifically to the transport and loading and unloading of cargo containers positioned thereon.

BACKGROUND OF THE INVENTION

Cargo transported overland is often carried in a standard ISO-type cargo container which is secured to a trailer which, in turn, is connected to and drawn by a tractor. The two standard size cargo containers are 20 feet and 40 feet in length. A fully loaded 20 foot cargo container can typically weigh 44,800 pounds. In the early 1980's, a new heavier capacity cargo container was introduced worldwide. This new 20 foot container can weigh up to 52,920 pounds fully loaded.

The load capacity of the tractor-trailer is limited worldwide primarily by the deemed effect of the weight on the road. Factors which are considered include the gross weight and the weight on each axle of the trailer. In recent years, the trucking industry in Canada and the U.S.A. has been pressing for size and weight increases in order to increase carrying capacity and thus their productivity. The industry argues that much greater pay-loads are possible for the same hauling costs by reducing the number of trips required. It is argued that this also will increase safety by reducing the exposure. Opponents contend that increasing the permissible size and weight will cause more rapid deterioration of existing roads and bridges and require greater public expenditures for new roads, bridges, and exit ramps.

In Canada, regulations governing the size and weight of commercial vehicles are the responsibility of individual provinces and territories. Ontario currently limits the permissible weight on single axles to a maximum of 10,000 kilograms and 19,100 kilograms for tandem axles. The maximum gross weight allowed is 140,000 pounds or 63,500 kilograms which is achievable with a tractor plus two semi-trailers with a total of seven or eight axles. In Quebec, tandem axles may be loaded to 20,000 kilograms. The Canadian limits are generally greater than those permitted in the United States.

In the United States, the laws are generally the responsibility of the individual states, except on the U.S. Interstate Highway System which is under federal control. For example, the new 1983 legislation requires the states to permit up to 20,000 pounds single, 34,000 pounds tandem and 80,000 pounds gross vehicle weight on the Interstate Highways.

The trucking industry is further regulated in the United States by the Interstate Bridge Laws which dictate the maximum load which can be transported over bridges. The Federal Bridge Formula, used to calculate this limit, is a function of the number of axles and the distance between extremes of any group of two or more consecutive axles. Accordingly, the longer the trailer, the less stress there is on the bridge. While the load capacity can be increased by extending the wheelbase, the cargo container has to be centrally mounted to ensure proper weight distribution to the axles. However, central mounting of the cargo container on the trailer, for example by mounting a 20 foot container on a 40 foot chassis, poses problems in the loading and unloading of the cargo container, as will be discussed in more detail hereinafter.

The standard ISO-type cargo containers are typically mounted on trailers which are drawn by tractors. It is not uncommon to see a second trailer connected to the rear of the first trailer.

There are two methods of connecting trailers referred to by those skilled in the art as "A trains" and "B trains". In the A train configuration, a trailer-converter dolly is connected to the rear of the first trailer and the second trailer is then connected to the rear of the dolly. There are three articulation points in an A train: the first is a fifth wheel connection between the first trailer and the tractor, the second is a pintle hook between the dolly and the rear of the first trailer, and the third is a fifth wheel connection between the second trailer and the dolly. The A train configuration has the advantage that rear end loading and unloading of the cargo container is facilitated by disconnection of the dolly so that the rear of the first trailer can be butted against the loading dock. However, the double articulation at the dolly may be dangerous because it permits buckling and similar motions between the first and second trailers.

In the B train configuration, the second trailer overlaps and is partially supported by the rear axles of the first trailer. The B train has only two articulation points: the first at the fifth wheel connection between the first trailer and the tractor and the second at a second fifth wheel connection between the second trailer and the first trailer. This combination is generally more stable than the A train configuration because of the fewer articulation points. Moreover, the second fifth wheel connection has more structural integrity and better handling characteristics than the pintle hook connection at the first trailer-converter dolly. As such, the B train configuration is becoming the configuration of choice in the transport of two cargo containers. The disadvantage of the B train configuration is that rear end loading of the cargo container at a loading dock is difficult because of the substantial gap between the rear of the cargo container and the loading dock.

During loading and unloading of a cargo container, the trailer is usually backed up to a loading dock and the cargo is moved into or out of the container frequently using forklift trucks.

Typically the lead trailer of a B train tractor-trailer combination has an upper flatbed portion at the forward portion of the trailer and a lower deck portion which is located at the rear of the trailer. This step from the flatbed to the deck causes problems in the loading and unloading of cargo from the container. The problem is further compounded by the fifth wheel mounted on the deck of the lead trailer.

Arguin (U.S. Pat. Nos. 4,400,004, 4,526,395, 4,598,924, and 4,673,191) teaches one solution to this problem by the provision of a platform which is hinged to the chassis of the trailer at the rear end of the cargo container. The platform normally lies against the container door when the container is being transported. When the container is to be loaded or unloaded the platform is lowered to a horizontal position. A plate attached to the platform lies on the fifth wheel and legs are provided to give additional support for the platform. This allows a forklift truck to enter the container from the loading dock. Although the floor of the cargo container is at the same level as the loading dock, there is still a gap between the container and the loading dock. This is particularly a problem in inclement weather and in the transport of frozen foods. Many loading docks are provided with a seal against which the rear of the container is pressed to ensure that loading and unloading is done without loss of either cooled or heated warehouse environment.

U.S. Pat. No. 5,026,228 (Mansfield) discloses a means for moving a cargo container attached to a horizontal bar on the deck portion at the rear of the trailer. The bar, and therefore the cargo container, is moved by a hydraulic actuator to the rear of the trailer so that there is no gap between the container and the loading dock. The deck has a pair of strips of a low-friction material such as molyfilled nylon to allow the horizontal bar to move more easily across the deck. Upwardly protruding regions of the beams on the flatbed portion of the trailer are also provided with strips of low-friction material to allow the container to slide back and forth on the flatbed. The cargo container has slots which engage these upwardly protruding regions of the beams to prevent sideways movement of the container as the container is moved. Although the possibility of a lockdown mechanism at the front of the container to prevent movement of the container during transport is alluded to, it will be understood by those skilled in the art that alignment of the container, especially when fully loaded, during movement to the docking position and locking of the cargo container to prevent any movement whether sideways or vertically are major considerations for a workable solution. Furthermore, during transport the strips of low-friction material on the deck and the upwardly protruding regions of the beams will become soiled with dust, mud, gravel, snow, ice, slush, etc. that will prohibit movement of the cargo container on the strips.

It is advantageous to have the cargo container butt against the edge of the loading dock so that forklift trucks can be driven directly into the cargo container from the loading dock without the need for a gap bridging platform or a ramp. For example, in the transport of frozen foods it is desirable and may even be mandatory to provide a seal in the space between the rear of the cargo container and the entryway of the loading dock through which the frozen cargo is loaded and unloaded in order to prevent exposure of the cargo to temperatures above freezing. Moreover, it is often desirable to have little or no gap between the cargo container and the loading dock to protect forklift operators and cargo from inclement weather. A typical loading dock is about 50 to 53 inches high although some have means for adjustment from 48 to 54 inches. It can be appreciated by those skilled in the art that it is also desirable to have the floor of the cargo container at the same height as the floor of the loading dock.

SUMMARY OF THE INVENTION

The present invention provides a "B-train" truck train in which the front trailer is provided with means for satisfying all of the above requirements.

A dockable container chassis has a sidable bunk for carrying the container between transport and docking positions. This chassis may be used as the lead trailer of a "B train" or as a single semi-trailer. When the chassis is the lead trailer, a fifth wheel is mounted at the rear thereof between the chassis sides. The tail trailer is then equipped with a kingpin mounted to connect with the fifth wheel on the rear of the lead trailer, without interference between the chassis of the two units. The bunk on the lead trailer rides over the fifth wheel of the lead trailer which is located between the sides of its chassis. Locking means are provided to restrain the bunk from movement unless unlocked and the bunk is being moved from the docking to a transport position.

BRIEF DESCRIPTION OF THE DRAWINGS

In the accompanying drawings which illustrate an embodiment of the present invention:

FIG. 5 is a top plan view of the container transport bunk of the lead trailer;

FIG. 6 is a side elevational view of the bunk of FIG. 5;

FIG. 20 is a side elevation of the tail trailer with sliding rear bogie;

FIG. 21 is a side view of the trailer chassis of FIG. 20;

DESCRIPTION OF THE PREFERRED EMBODIMENTS

Figure 1:
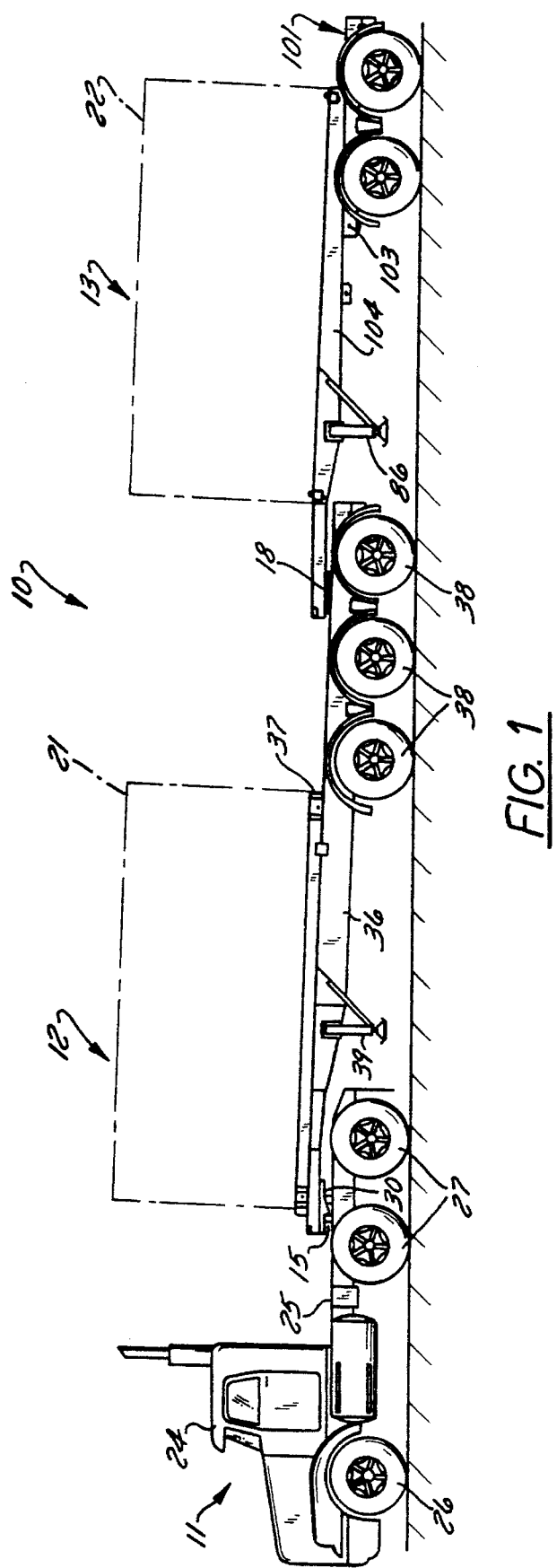
FIG. 1 is a side-elevational view of the tractor-trailer combination showing the lead and tail trailers and their respective cargo containers in the transport position.

FIG. 1 illustrates a B train tractor-trailer combination 10 in accordance with the present invention, including a tractor 11, a lead trailer 12, and a tail trailer 13. The lead trailer 12 is connected to the tractor 11 with a first fifth wheel-kingpin assembly 15 of well known construction. The tail trailer 13 is connected to the lead trailer 12 with a second fifth wheel-kingpin assembly 18. Both the lead trailer 12 and the tail trailer 13 are adapted to carry standard ISO-type cargo containers 21 and 22, respectively.

The tractor 11 has a driver's cab 24, a deck 25 at the rear of the tractor 11, a front set of wheels 26, and a rear set of wheels 27. The first fifth wheel assembly 15 is comprised of a fifth wheel 30 mounted on the deck 25 of the tractor 11 and a king-pin 31, shown more clearly in FIG. 2, which projects from the underside of the middle front of the lead trailer 12. The second fifth wheel assembly 18 is comprised of a fifth wheel 32 mounted on the rear of the lead trailer 12 and a king-pin 33 projecting from the underside of the middle front of the tail trailer 13.

Figure 2:
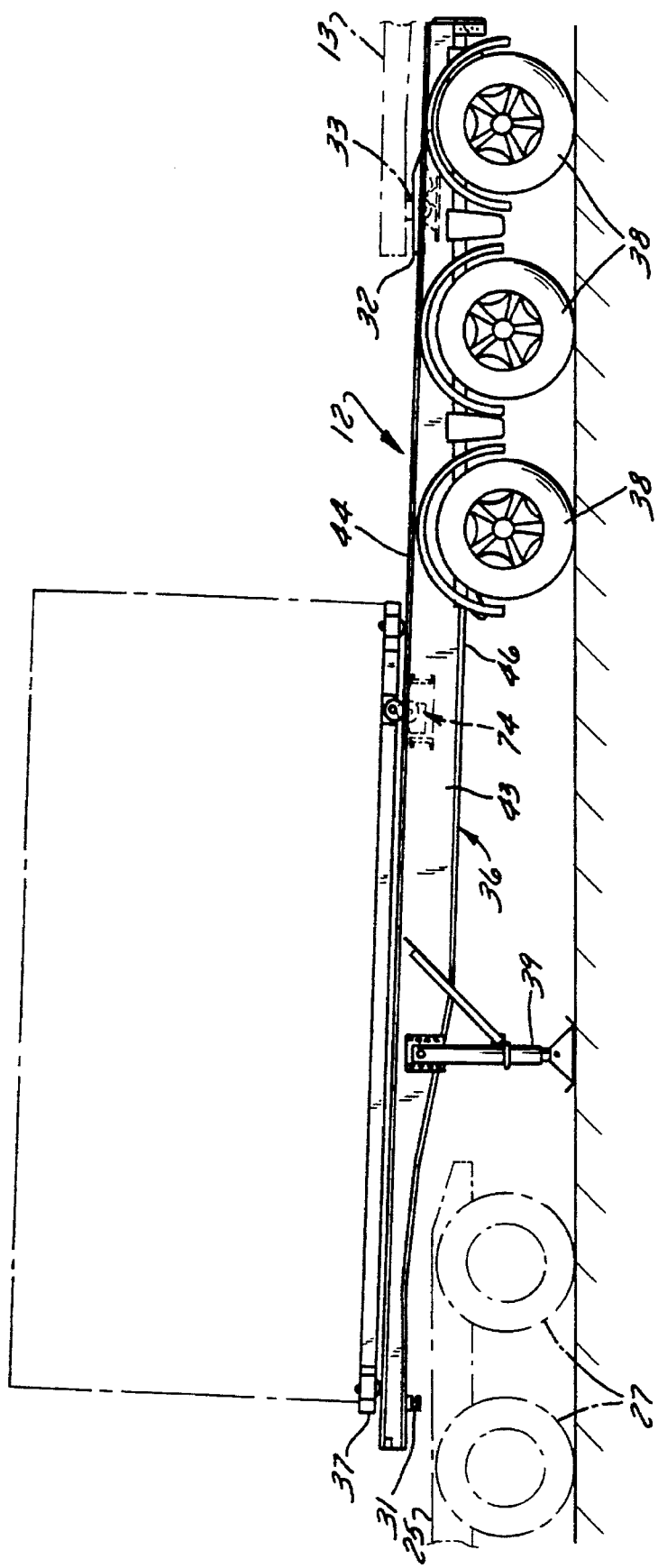
FIG. 2 is a side elevational view of a lead trailer.

Referring now to FIG. 2, the lead trailer 12 has a chassis 36, a bunk 37 slidably mounted on the chassis 36, a triple set of wheels 38 located at the rear of the lead trailer 12, and a retractable landing gear mechanism 39 attached proximate the front of the chassis 36 to support the front end of the lead trailer 12 when the lead trailer 12 is not connected to a tractor 11.

Figure 3:
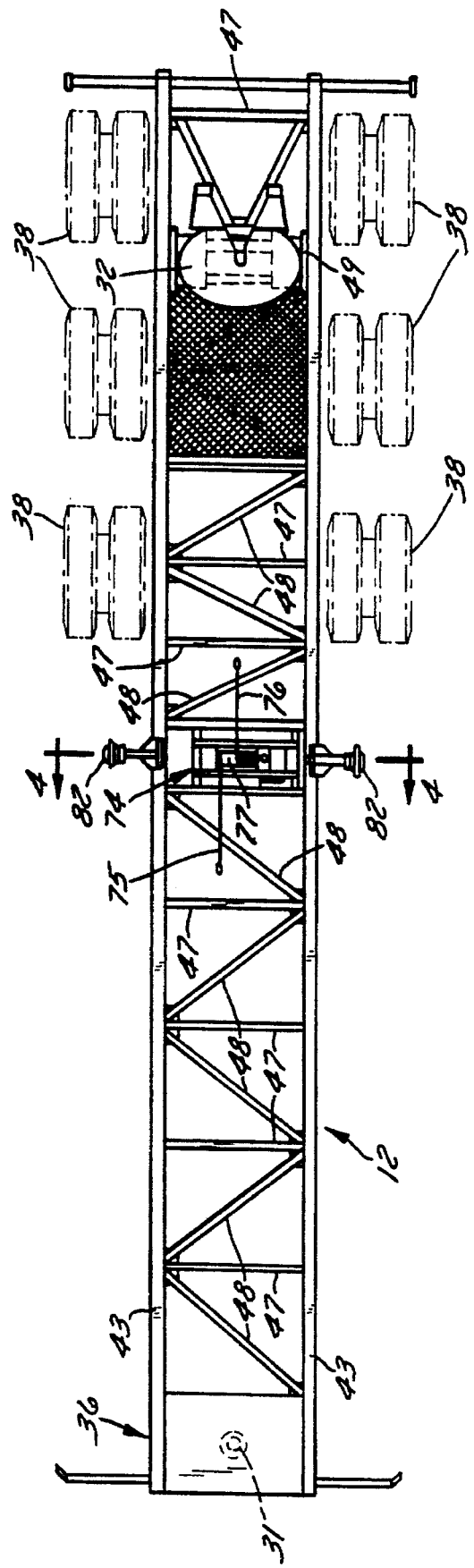
FIG. 3 is a top plan view of the chassis of a lead trailer.
Figure 4:
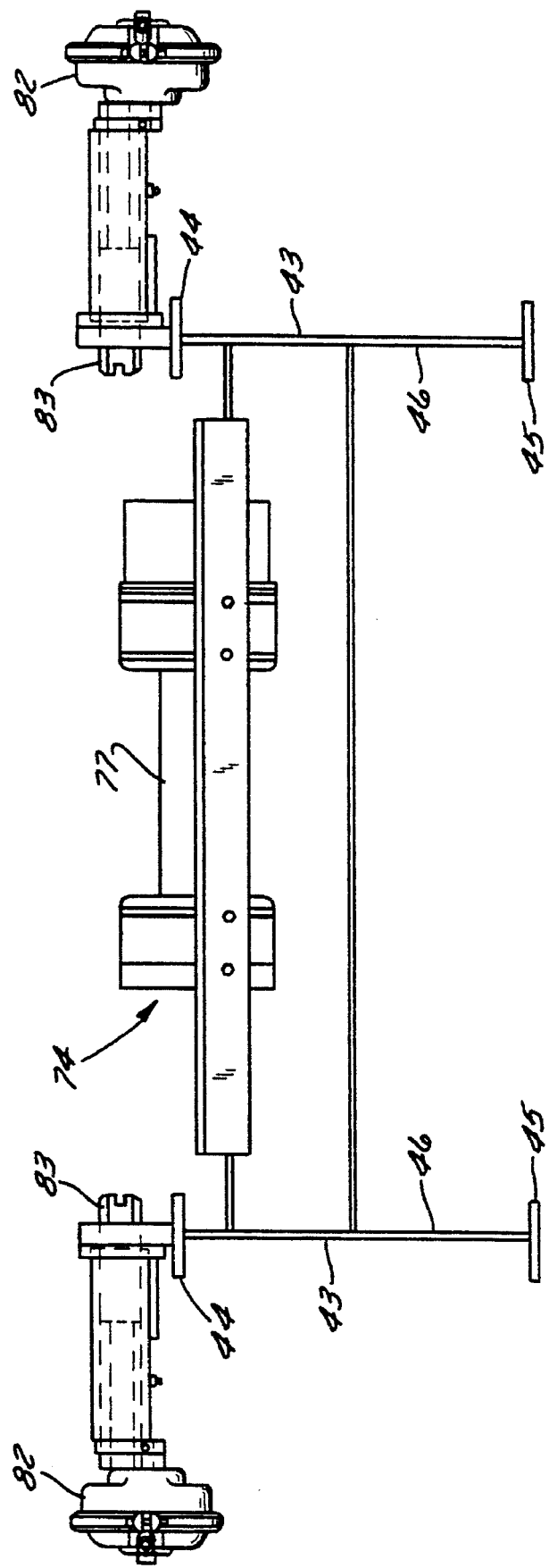
FIG. 4 is a cross-sectional view of the chassis of the lead trailer along the line 4—4 of FIG. 3.

Referring now to FIG. 3, the chassis 36 has two longitudinal chassis beams 43 which run the length of the lead trailer 12. The longitudinal chassis beams 43 are held in spaced apart relation by chassis cross members 47 and chassis truss members 48. Each chassis beam 43 is substantially H-shaped in cross-section, as shown more clearly in FIG. 4, and has a top flange 44, a bottom flange 45, and a web 46. The top flange 44 of the chassis beam 43 is straight while the depth of the web 46 varies along the length of the chassis beam 43, as shown in FIG. 2. The depth of the web 46 is greatest in the middle section of the chassis beam 43 while at the front and rear ends of the chassis beam 43, the depth of the web 46 is reduced to provide clearance for the rear set of wheels 27 of the tractor 11 and the rear set of wheels 38 of the lead trailer 12, respectively.

For example, the depth of the web 46 at the front of the lead trailer 12 is 7⅝ inches and at the rear the depth is 8¹/₁₆ inches. At its greatest depth the web 46 is 16 inches, sufficient to support the load of the cargo container 21 and its contents. Furthermore this construction of the longitudinal chassis beams 43 reduces the weight of the lead trailer 12 while maintaining structural integrity.

At the front of the lead trailer 12, the chassis 36 is of a height to allow for connection of the king-pin 31 to the fifth wheel 30 on the deck 25 of the tractor 11. In the embodiment shown in FIGS. 1 and 2, showing a standard tractor 11 and fifth wheel 30, the top of the chassis beam 43 is at a height of 56⅞ inches at the front of the lead trailer 12. Loading docks however are typically 50 to 53 inches high although some have means for adjustment from 48 to 54 inches. Moreover the bunk 37 which is slidably mounted on the chassis 36 raises the cargo container 21 approximately 6 inches while the floor of a standard ISO-type cargo container 21 is approximately 6½ inches thick. If the chassis 36 were substantially horizontal and the bunk 37 was moved to the rear of the lead trailer 12, the floor of the cargo container 21 would be 69⅜ inches high or 16⅜ to 19⅜ inches higher than a typical loading dock. This would cause a problem in the loading and unloading of the cargo container 21. In order to overcome this problem the upper surface of the beams 44 is inclined downward to the rear of the lead trailer 12. At the rear of the lead trailer 12, the chassis 36 is of a height so that the floor of the cargo container 21 is level with the floor of a normal loading dock. The height of the top of the chassis beam 43 at the rear of the lead trailer 12 as shown in FIGS. 1 and 2 is 42⅛ inches. This dimension can vary from 40 to 42 inches depending on whether or not the container is fully loaded.

Figure 29:
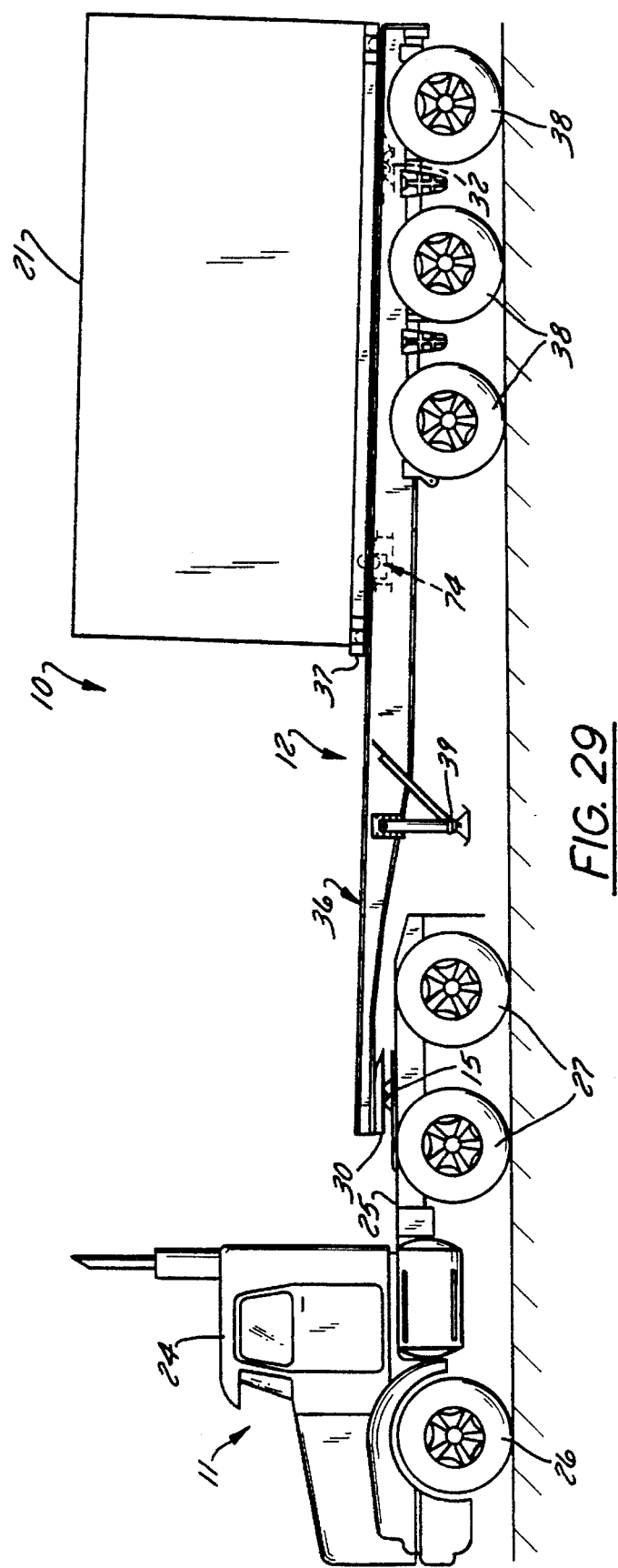
FIG. 29 is a side-elevational view of the tractor with the lead trailer and the cargo container in the docking position.

Other elements of the present invention discussed hereinafter bring the height of the floor of the cargo container 21 to the height of the loading dock. Over the length of the lead trailer 12, 426⅜ inches, the slope of the chassis 36 is 3.5%. This slope can range from 3% to 5% depending on the height of certain components of the tractor-trailer combination 10, for example the height of the rear set of wheels 27 of the tractor 11, etc. It will be understood that the length of the frame can be varied to accommodate weight and size laws. Above all, the slope of the chassis 36 is designed so that at the rear of the lead trailer 12, the floor of the cargo container 21 is at the same height as the floor of the loading dock when the cargo container 21 is in the docking position as shown in FIG. 29.

Referring now to FIGS. 5 and 6, the bunk 37 is comprised of a pair of longitudinal bunk beams 52 separated by a distance approximately equal to the distance between the longitudinal chassis beams 43 of the chassis 36. A pair of horizontal bars, 53 and 54, are attached to the front and rear ends of the longitudinal bunk beams 52, respectively, and extend to either side of the bunk 37 for a distance to accommodate the cargo container 21. The longitudinal bunk beams 52 are further strengthened by bunk cross members 55 and bunk truss members 56 which prevent racking of the bunk 37 when the cargo container 21 is mounted thereon.

Figure 7:
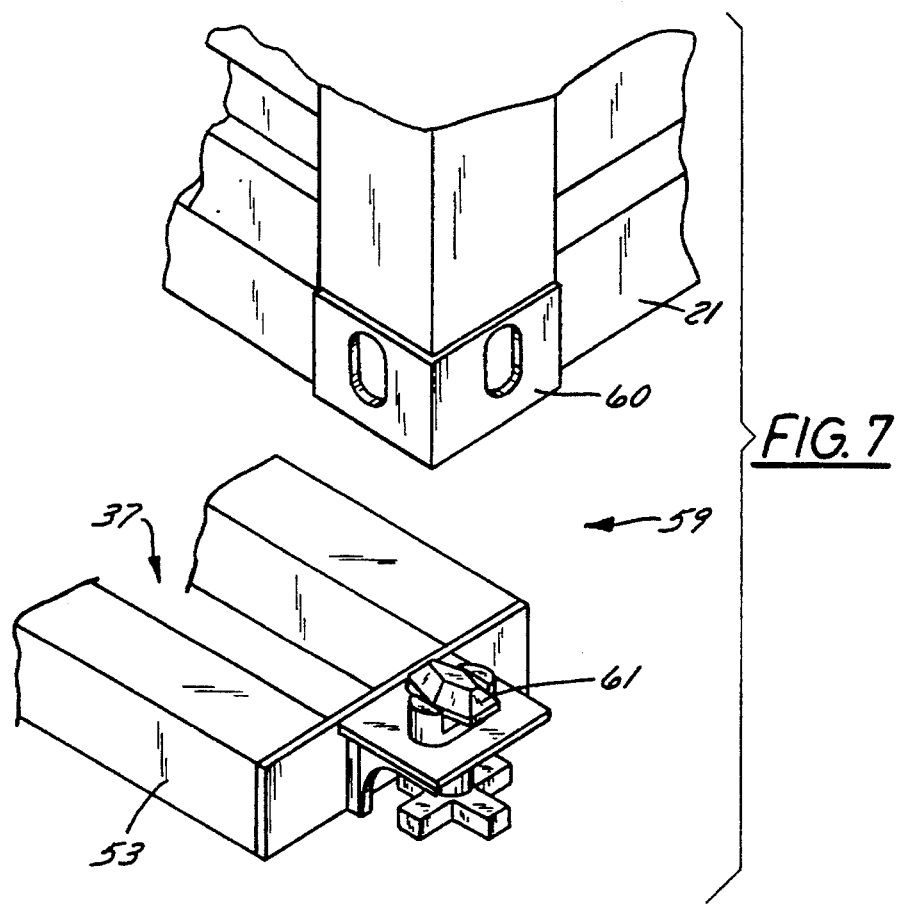
FIG. 7 is a perspective view of the components of a twist lock fitting used to lock the bunk and container together.

As shown more clearly in FIG. 7, the cargo container 21 is mounted on the bunk 37 and secured by standard twist lock fittings 59. A female portion 60 of the twist lock fitting 59 is located in each of the bottom four corners of all standard cargo containers 21 and 22 while a corresponding male portion 61 projects upwardly from each end of the pair of horizontal bars 53 and 54 of the bunk 37.

Figure 8:
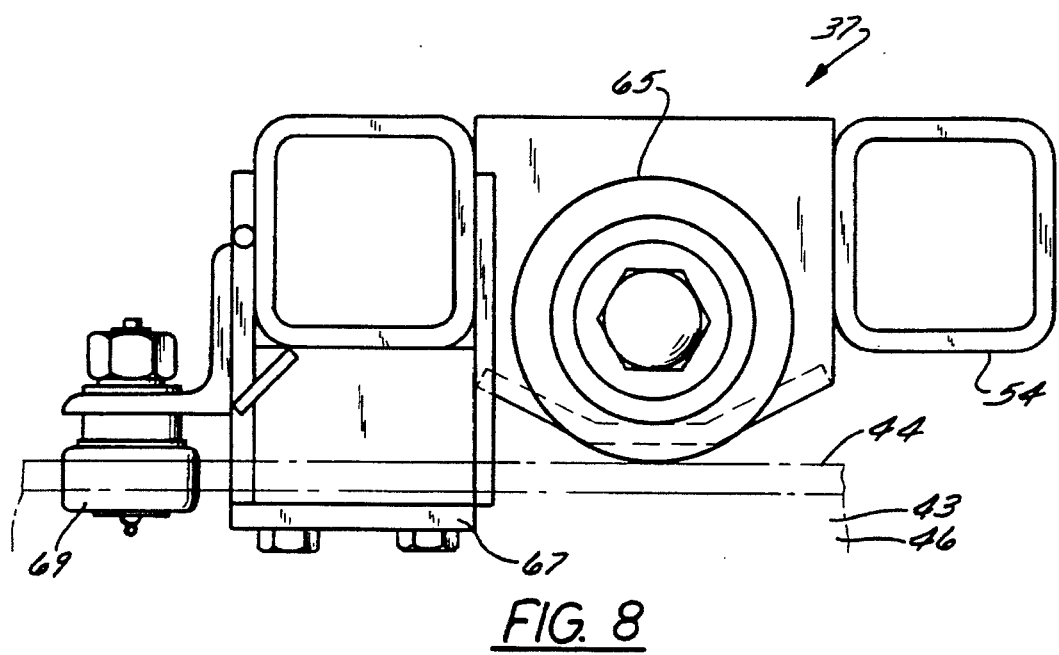
FIG. 8 is a partial cross-sectional view of the bunk at the line 8—8 of FIG. 5.
Figure 9:
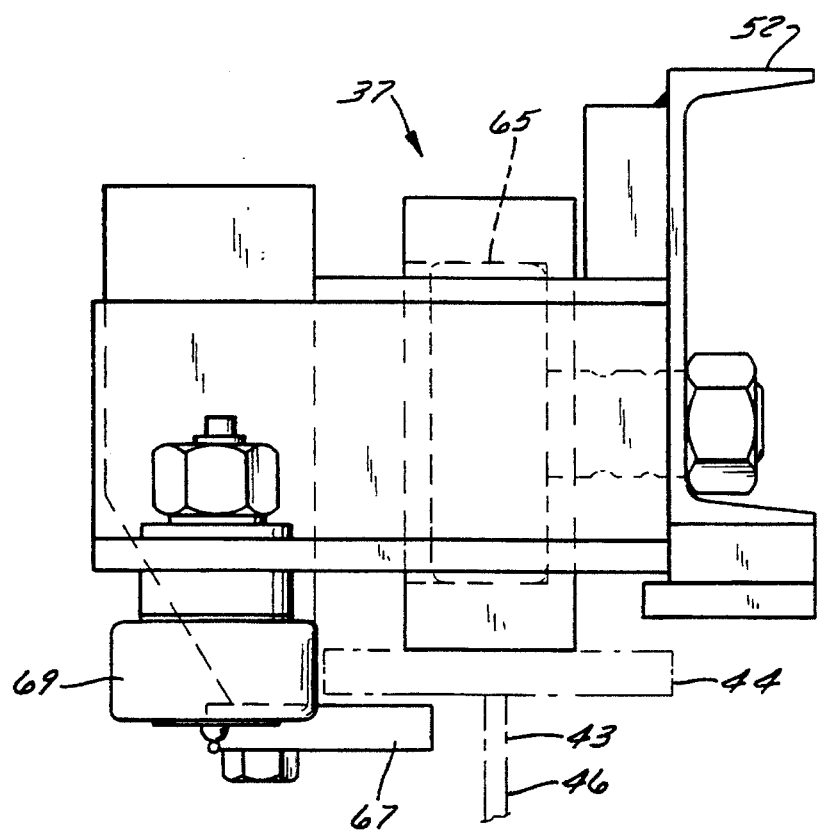
FIG. 9 is a front elevational view of FIG. 8.
Figure 10:
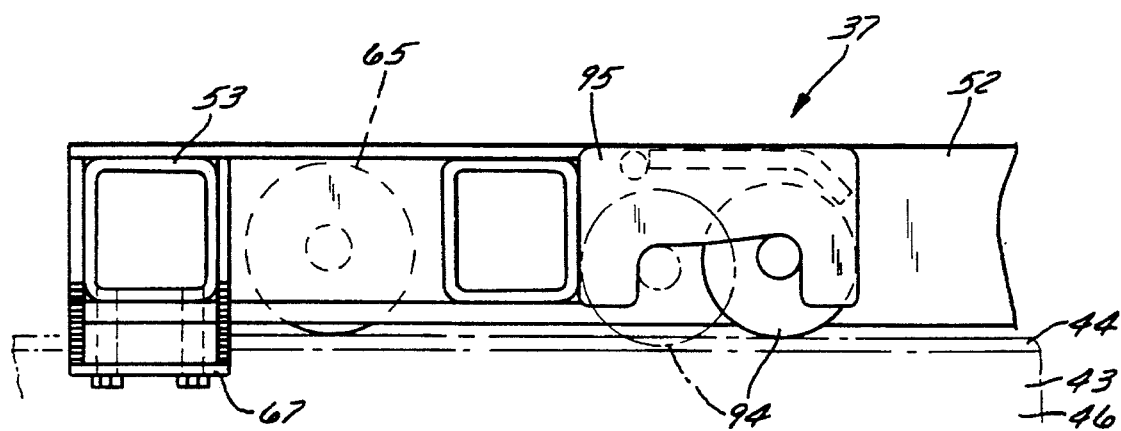
FIG. 10 is a partial cross-sectional view of the bunk at the line 10—10 of FIG. 5.

Referring now to FIGS. 8 through 12, the bunk 37 moves along the top flanges 44 of the longitudinal chassis beams 43 on load-bearing rollers 65. Preferably, there are four load-bearing rollers 65: one pair located in the front horizontal bar 53 of the bunk 37, as shown in FIG. 10, and a second pair located in the rear horizontal bar 54 of the bunk 37, as shown in FIG. 8.

The bunk 37 is prevented from dismounting from the chassis 36 by the four load-bearing rollers 65 acting on the top of the top flange 44 of the longitudinal chassis beam 43 of the chassis 36, four retainer plates 67 acting on the bottom of the top flange 44, and four cam-follower guide wheels 69 acting on the edges of the top flange 44.

Figure 12:
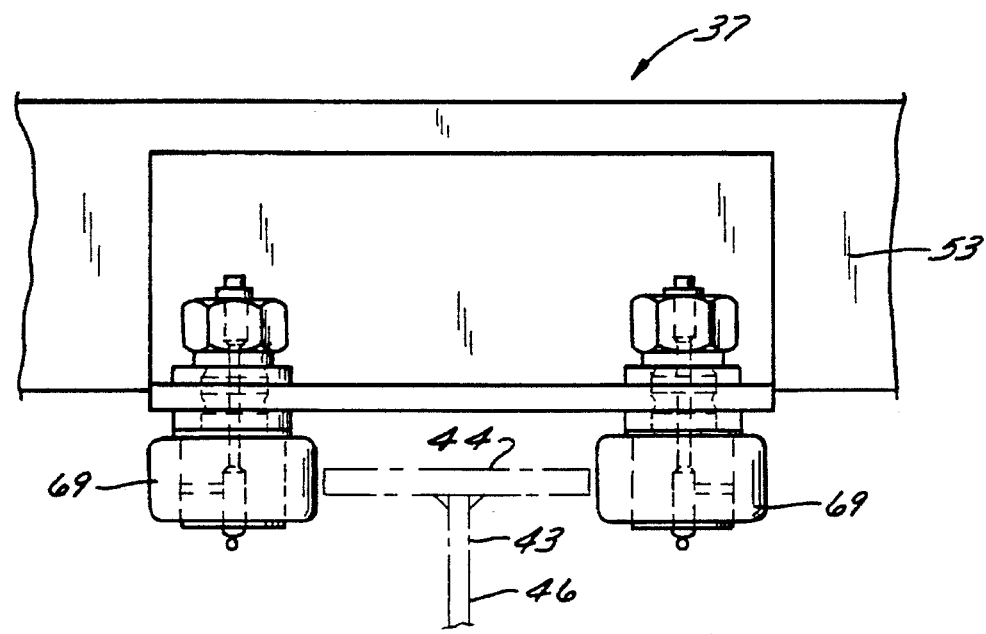
FIG. 12 is a partial cross-sectional view of the bunk at the line 12—12 of FIG. 5.

The retainer plates 67 are bolted to the horizontal bars 53 and 54 of the bunk 37 in such a manner as to provide a gap of ¼" between the retainer plate 67 and the bottom of the top flange 44 of the longitudinal chassis beam 43, as shown more clearly in FIGS. 9 and 12. Accordingly some vertical movement of the bunk 37 on the chassis 36 is permitted while the bunk 37 is prohibited from tipping off the chassis 36.

The cam-follower guide wheels 69 guide the bunk 37 when it is being moved relative to the chassis 36 so that there is no lateral friction of the bunk 37 on the chassis 36. Two of the cam-follower guide wheels 69 are located forward of the rear horizontal bar 54 of the bunk 37, as shown more clearly in FIGS. 8 and 9. Each of this pair of wheels 69 acts on the outside edge of the top flange 44 of the longitudinal chassis beams 43. Now referring to FIGS. 10 through 12, at the front of the bunk 37, there are two cam-follower guide wheels 69 located forward of the front horizontal bar 53. These wheels 69 act on the inside and outside edges of the top flange 44 of one longitudinal chassis beam 43. In this case they are installed on the right or curbside beam. The cam-follower guide wheels 69 act to reduce the amount of energy required to move the loaded cargo container 21. They also prevent the paint on the chassis 36 from being damaged when the cargo container 21 is being moved.

Figure 13:
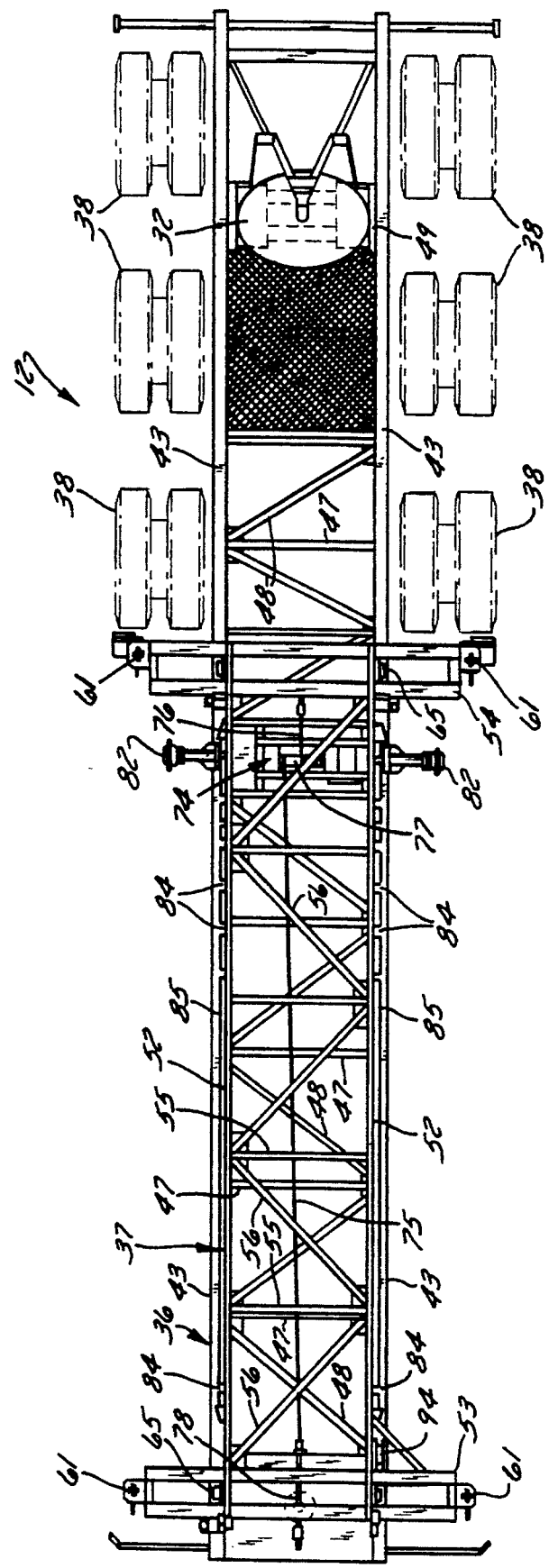
FIG. 13 is a top plan view of the chassis with the bunk in the transport position.
Figure 14:
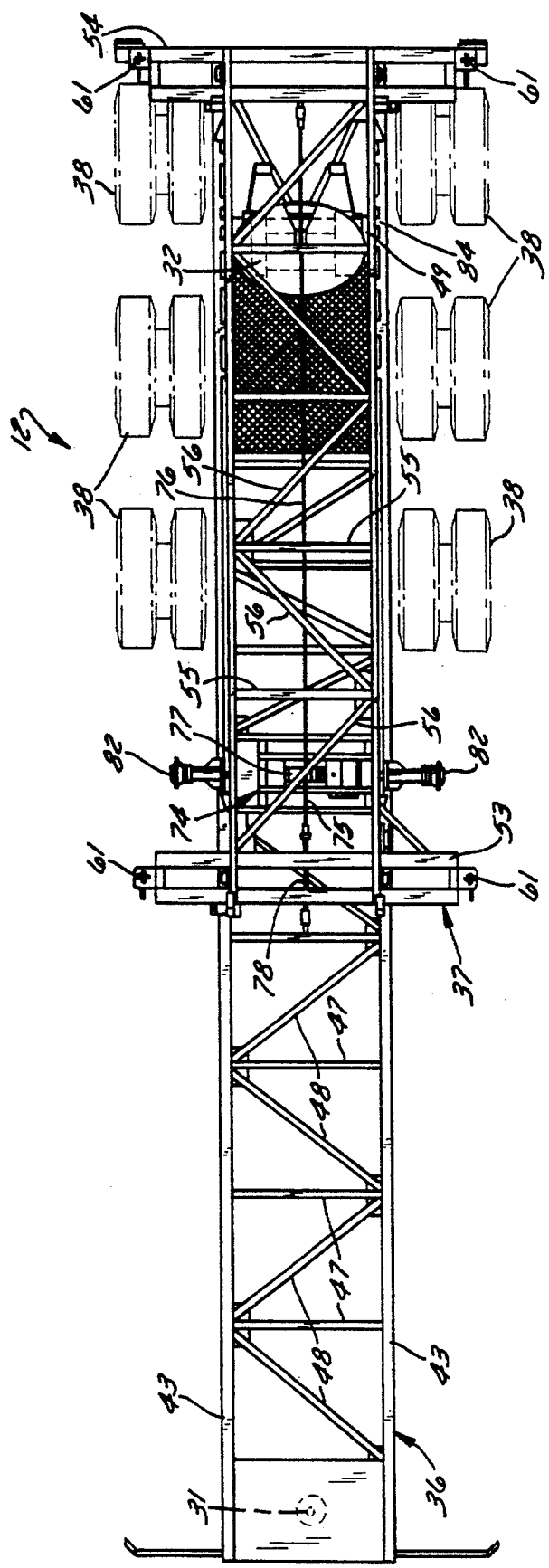
FIG. 14 is a top plan view of the chassis with the bunk in the docking position.

Referring now to FIGS. 13 and 14, the bunk 37 moves along the length of the chassis 36 from a transport position to a docking position by drive means such as a winch assembly 74. The winch assembly 74 is comprised of a forward cable 75, a rearward cable 76, and a capstan 77. The forward cable 75 is connected at one end to the front horizontal bar 53 of the bunk 37 and at the other end to the capstan 77. The rearward cable 76 is connected at one end to the rear horizontal bar 54 of the bunk 37 and at the other end to the capstan 77.

When the bunk 37 is in the transport position as shown in FIG. 13, the rearward cable 76 is substantially fully wound about the capstan 77 and the forward cable 75 is substantially fully extended. When the winch 74 is operated and the bunk 37 is urged backwards from the transport position to the docking position, as shown in FIG. 14, the forward cable 75 is wound around the capstan 77 while the rearward cable 76 is unwound from the capstan 77. Conversely, when the bunk 37 is moved forward from the docking position to the transport position, the rearward cable 76 is wound around the capstan 77 while the forward cable 75 unwinds from the capstan 77.

When an empty cargo container 21 is moved to the docking position, the forward cable 75 is relatively loosely wound on the capstan 77. Then when the fully loaded cargo container 21 is moved back to the transport position the rearward cable 76 winds tightly on the capstan 77 and the previously loosely wound forward cable 75 is unwound from the capstan 77. In order to compensate for the resulting slack, the forward cable 75 is provided with a spring 78 at its connection with the front horizontal bar 53 to maintain tension in the forward cable 75. The spring 78 prevents the forward cable 75 from resting loose over the cross members 47 and the truss members 48 of the chassis 36.

The bunk 37 is held in relative position to the chassis 36 by a locking means such as a pair of pneumatic locking pins 82. The pneumatic locking pins 82 engage apertures 84 along the web of the longitudinal bunk beams 52 of the bunk 37. Preferably, the apertures 84 are rectangular in shape to allow for some vertical movement of the bunk 37 relative to the chassis 36. This is particularly important when the loaded cargo container 21 is in the docking position as there is some inherent deformation of the chassis 36. Furthermore, it will be appreciated by those skilled in the art that when an empty cargo container 21 is locked in the docking position, the pneumatic locking pin 82 is positioned at a first vertical position in the rectangular aperture 84. When the cargo container 21 is then fully loaded, there is some deformation of the chassis 36 and the pneumatic locking pin 82 moves to a second vertical position in the rectangular aperture 84.

For ease of construction and in order to maintain the structural integrity of the longitudinal bunk beams 52, an aperture plate 85 is overlaid on the outside face of each longitudinal bunk beam 52. This is shown generally in FIGS. 4 and 5 and in more detail in FIGS. 15 and 16. There is one aperture 84 at the front end of the aperture plate 85 which, when engaged by the pneumatic locking pin 82, holds the bunk 37 in the docking position.

There are several apertures 84 near the rear end of the aperture plate 85 which, when engaged by the pneumatic locking pin 82, hold the bunk 37 in the transport position. It will be appreciated by those skilled in the art that it is often desirable to adjust the relative position of the cargo container 21 on the lead trailer 12 in order to achieve the required distribution of the weight of the cargo container 21 for transport thereof. The provision of several apertures 84 near the rear end of the aperture plate 85 allows the bunk 37 to be moved backward or forward on the chassis 36 until the required weight distribution is achieved over the different axle groups to comply with the highway weight laws.

Figure 15:
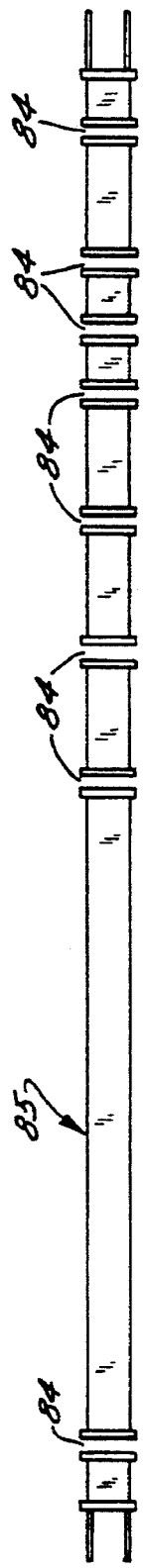
FIG. 15 is a side elevational view of the aperture plate of the bunk.
Figure 16:
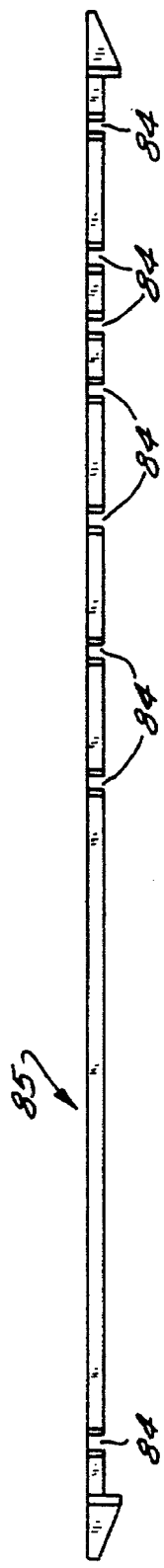
FIG. 16 is a top plan view of the aperture plate of the bunk.

The pair of pneumatic locking pins 82 is secured to the chassis 36 rearward of the winch assembly 74, as shown in FIGS. 15 and 16. While the apertures 84 are designed to allow for some vertical movement of the bunk 37 relative to the chassis 36, horizontal movement of the bunk 37 is not desirable once the bunk 37 is held in position by the pneumatic locking pins 82. Accordingly the locking pins 82 are adapted to engage the rectangular apertures 84 to allow for the slight vertical movement without unwanted horizontal movement.

Figure 17:
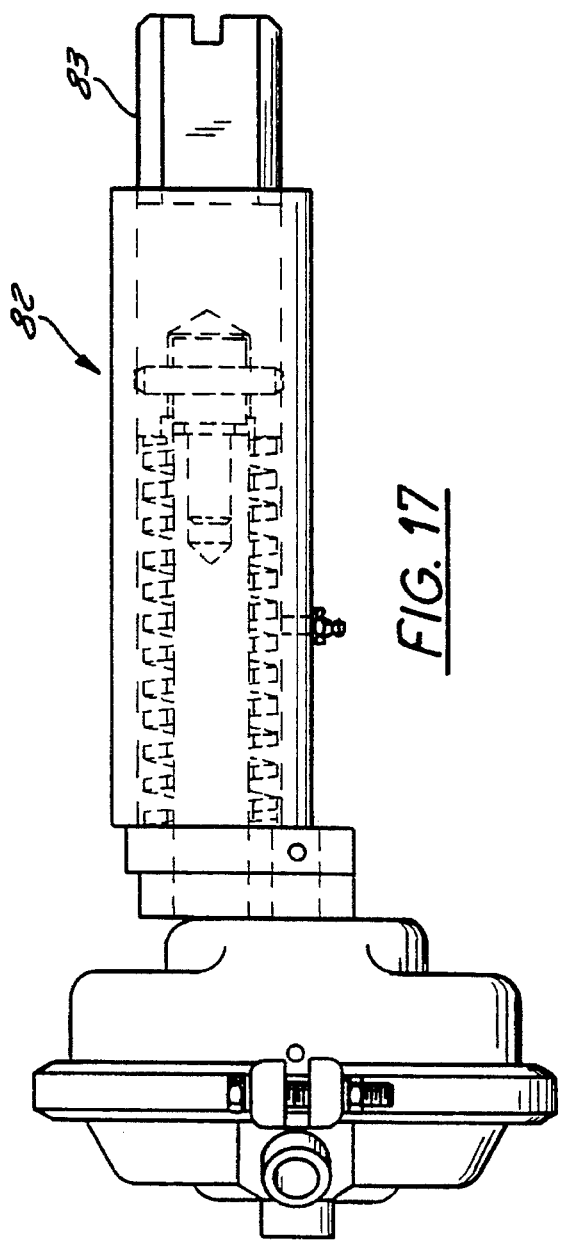
FIG. 17 is a side elevational view of a pneumatic cylinder and locking pin for securing the bunk to the lead trailer.
Figure 18:
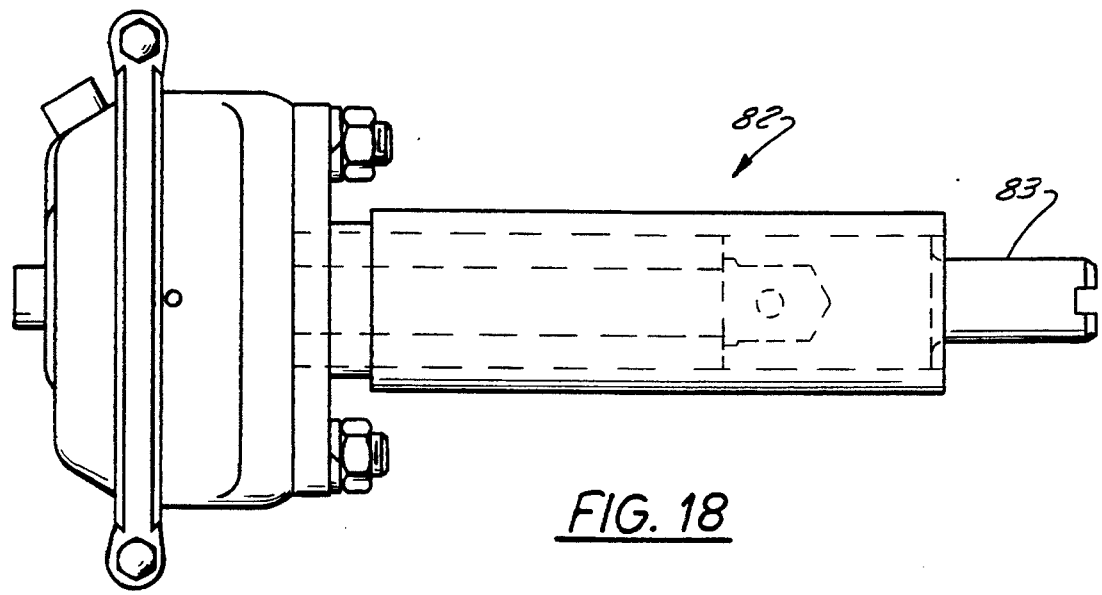
FIG. 18 is a top plan view of the pneumatic cylinder and pin of FIG. 17.

Referring now to FIGS. 17 and 18, the pneumatic locking pin 82 has a generally cylindrical bolt 83 which can be retracted or extended to engage the aperture 84. The bolt 83 is adapted with flat surfaces on its sides so that there is only a slight horizontal clearance between the bolt 83 and the aperture 84.

Figure 11:
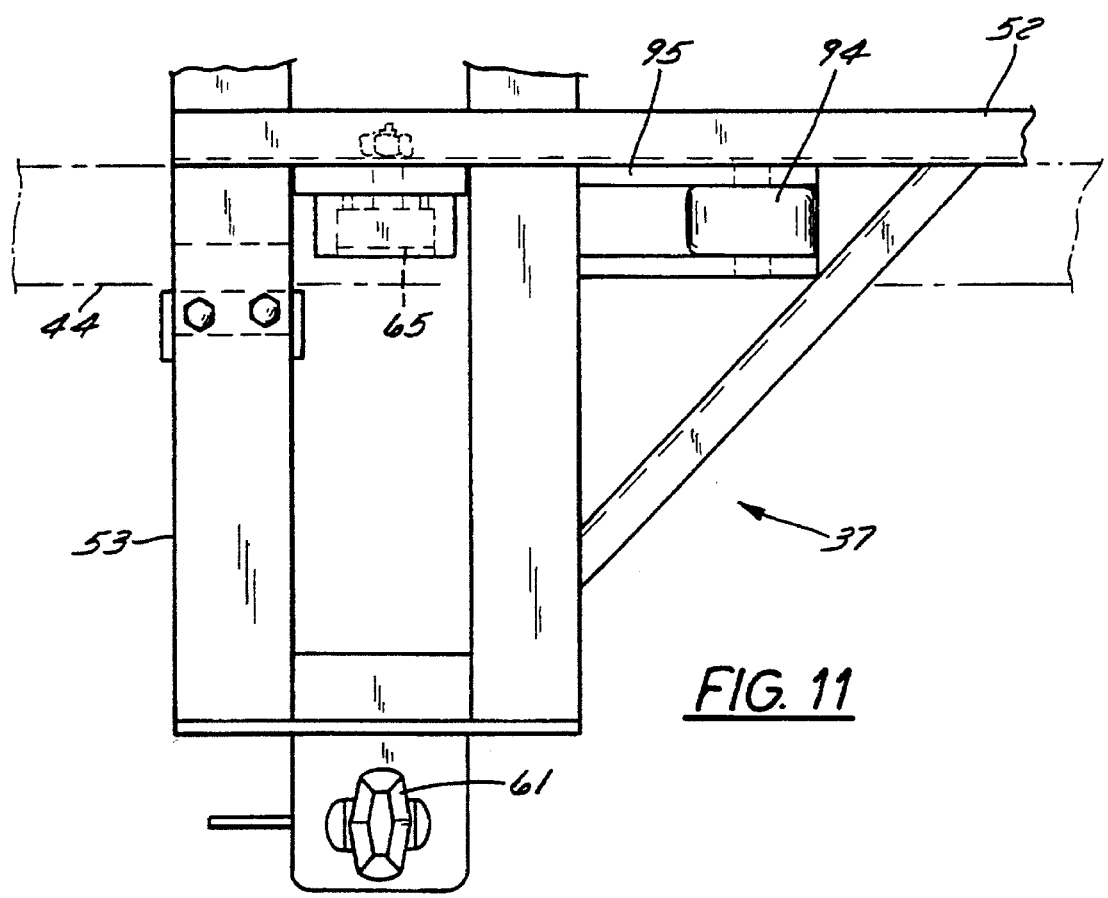
FIG. 11 is a top plan view of FIG. 10.

When the winch 74 is not in operation, movement of the bunk 37 is further prohibited by a braking roller 94 which is shown in FIGS. 10 and 11. The braking roller 94 is preferably located in a braking roller housing 95 behind one of the load-bearing rollers 65 on the front horizontal bar 53 of the bunk 37. In this position the braking roller 94 bears one-quarter of the load of the bunk 37 and the cargo container 21.

When the bunk 37 starts to roll on the load-bearing rollers 65 towards the rear of the lead trailer 12, the braking roller 94 moves forward to engage the braking roller housing 95. The resulting friction between the braking roller 94 and the braking roller housing 95 dissipates the energy of the downgrade moving bunk 37. When the winch 74 is operated to move the bunk 37 to the docking position the friction of the braking roller 94 against the braking roller housing 95 is overcome and the bunk 37 can be moved to the docking position. When the bunk 37 is moved up the incline of the chassis 36 to the transport position the braking roller 94 is free and trails behind the load-bearing roller 65.

Figure 19:
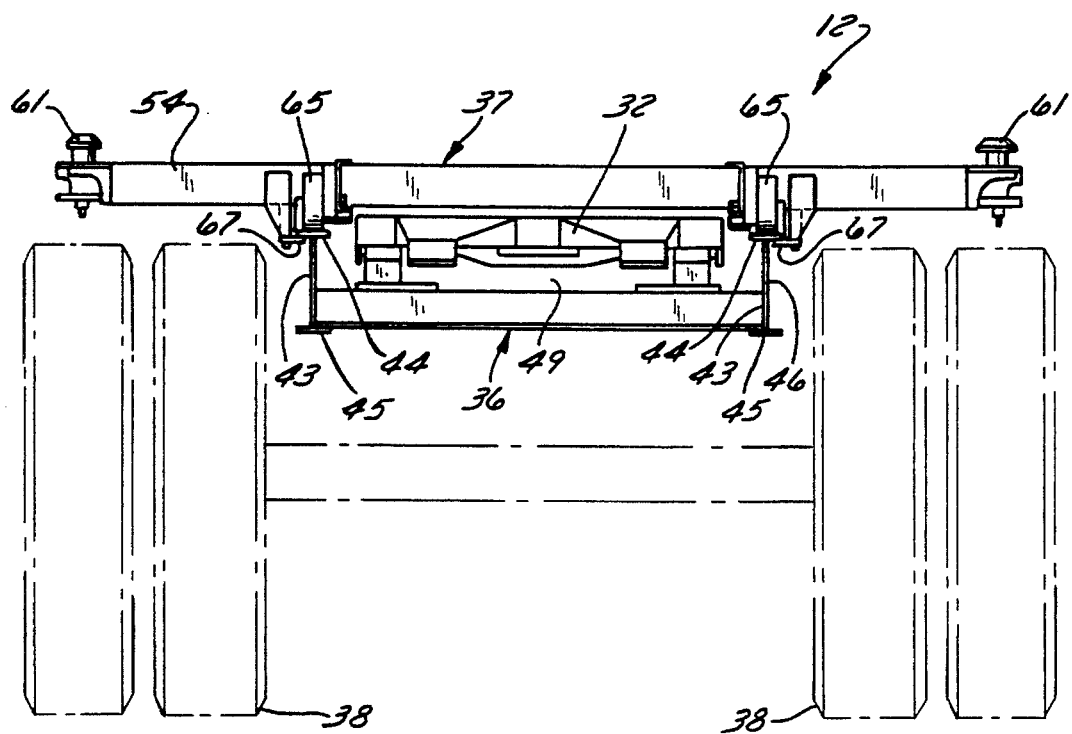
FIG. 19 is a rear elevational view of the lead trailer with the bunk in the docking position.
Figure 22:
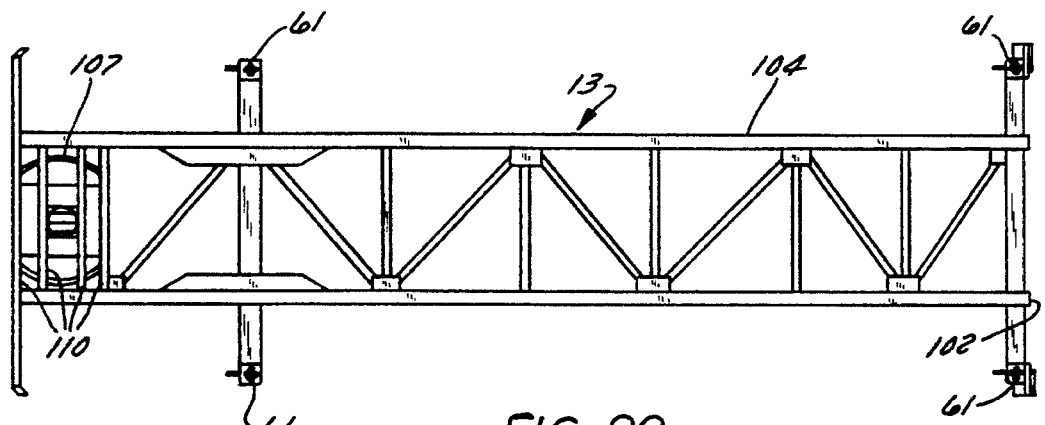
FIG. 22 is a plan view of the chassis of FIG. 21.

As the bunk 37 moves to the docking position on the chassis 36 it must pass over the fifth wheel 32 (FIG. 19) at the rear of the lead trailer 12. On a lead trailer of the prior art the fifth wheel is mounted on a platform on the lower deck portion at the rear of the trailer. The platform, in turn, is mounted on top of the frame of the trailer. In the present invention, the position of the fifth wheel 32 is modified so that the fifth wheel 32 lies between the longitudinal chassis beams 43 of the chassis 36. The fifth wheel 32 is mounted on a platform 49 which is attached, for example by welding to the web 46, of the chassis beams 43. In order to accommodate the relatively lower lying fifth wheel 32, the control handle (not shown) is adapted to pass through the web 46 of one of the longitudinal chassis beams 43. This is also clearly shown in FIG. 19.

Figure 23:
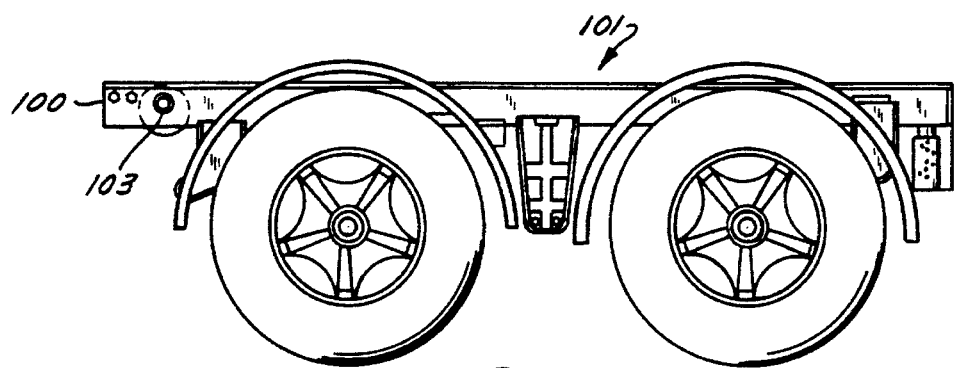
FIG. 23 is a side view of the tail trailer sliding bogie and sub-frame.
Figure 24:
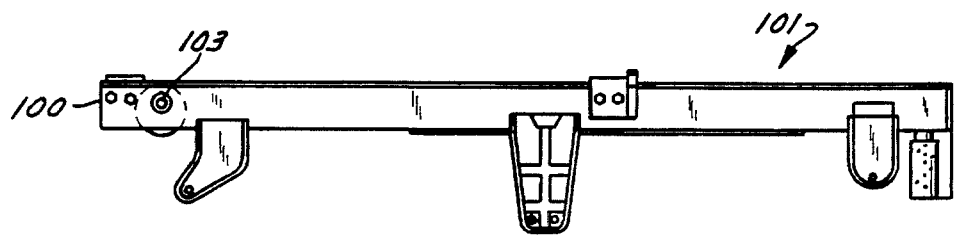
FIG. 24 is a side view of the sub-frame of FIG. 23.
Figure 25:
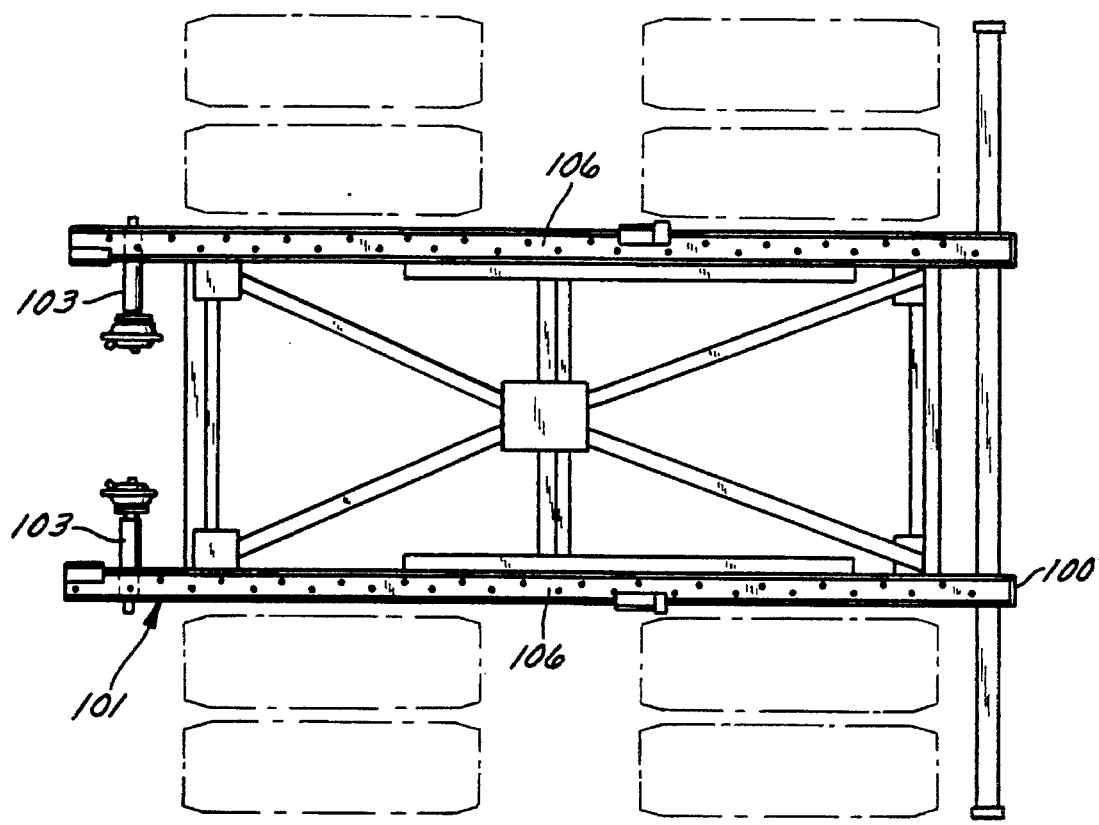
FIG. 25 is a plan view of the sub-frame of FIG. 24.

FIG. 20 is a side view of the tail trailer 13, with the slidable bogie 101 at the rear thereof, in transport position. It will be appreciated that the sub chassis 100 of the slidable bogie 101 is capable of being moved between the transport and docking positions by braking the wheels of the tail trailer with the pneumatic locking pins 103 (FIG. 25) retracted, and moving the front of the trailer chassis coupled to the fifth wheel of either a lead trailer or a tractor. The locking pins 103 may be engaged to lock the bogie in the desired position. In the docking position, the rear of the container comes flush with the rear of the chassis 102 of the tail trailer, and the container may be loaded or unloaded in the conventional manner discussed above. To assist the ease with which the sub chassis 100 may slide in relation to the tail trailer frame 104, the upper surface of the sub chassis 100 may be clad with a low friction surface such as UHMW polyethylene 106. Structural details of the chassis are clearly shown in FIGS. 23, 24 and 25.

Figure 26:
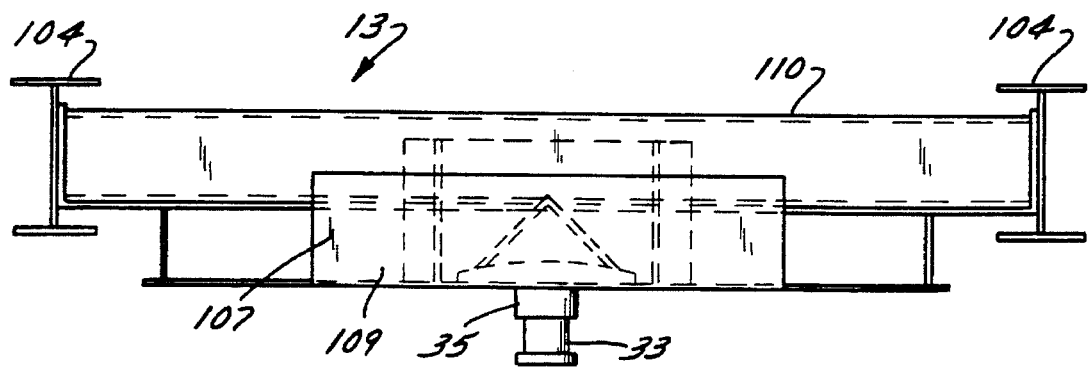
FIG. 26 is a front view of the tail trailer chassis showing the Kingpin location and support structure.
Figure 27:
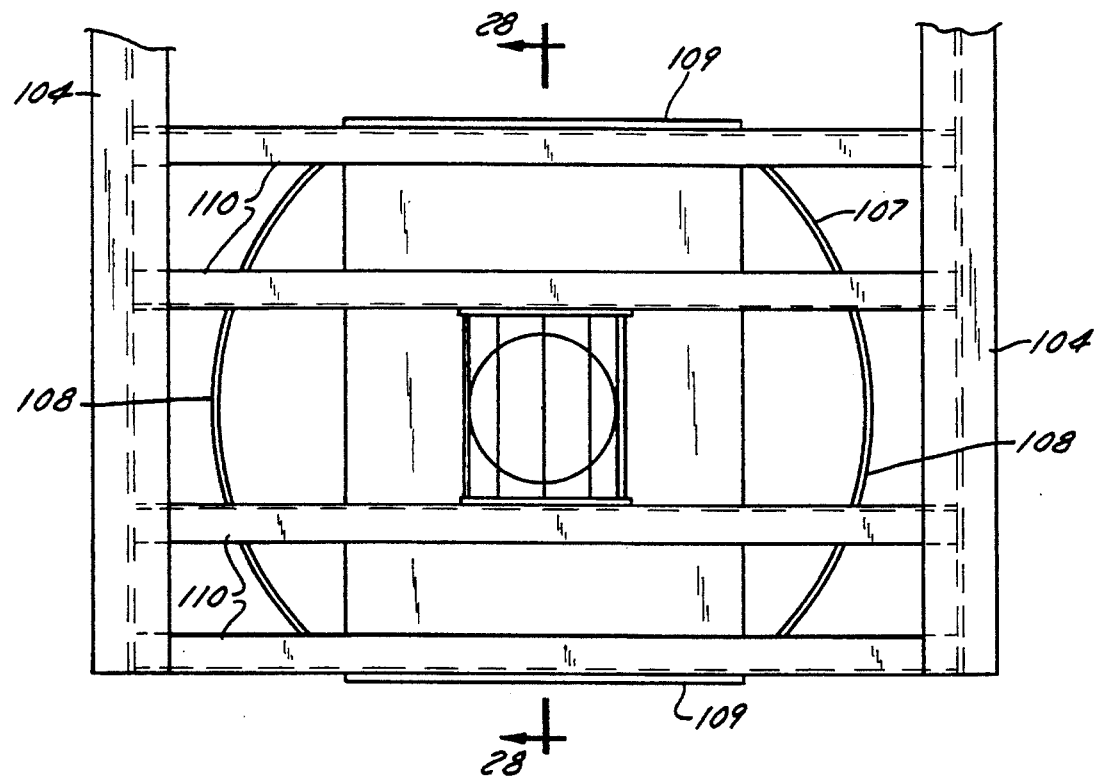
FIG. 27 is a partial plan view of the front section of the tail trailer chassis.
Figure 28:
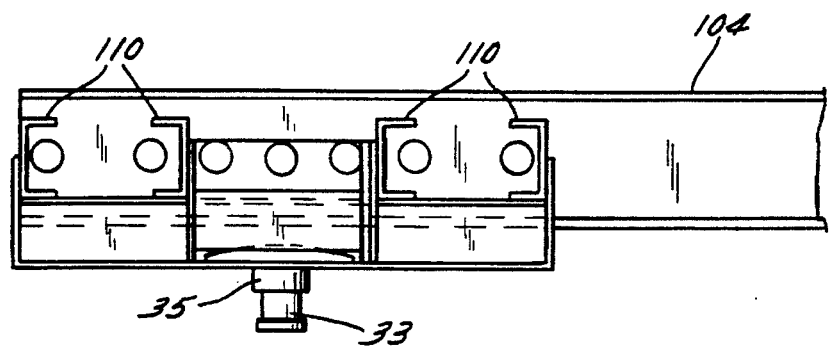
FIG. 28 is a section through FIG. 27 on the line 28—28.

FIGS. 26, 27 and 28 show the king pin mounting structure of the tail trailer. Kingpin 33 is secured by suitable welding to a curved wall box 107 having curved side walls 108 and flat front and rear walls 109. The box 107 is in turn secured to tail trailer frame by welding to cross channels 110 of the frame 104. The curved side walls 108 are dimensioned to fit within the frame members 43 of the lead trailer 12. The curvature of the walls 108 permits the articulation of the tail trailer while maintaining the king pin 33 at a height to mate with fifth wheel 32.

As the fifth wheel 32 is positioned relatively low on the rear of the lead trailer 12, the base 35 of the king-pin 33 is extended to provide the necessary clearance between the longitudinal chassis beams 43 of the lead trailer 12 and the chassis 97 of the tail trailer 13.

In operation, when the cargo container 21 of the lead trailer 12 is to be loaded or unloaded, the tail trailer 13 is dismounted from the tractor-trailer combination 10 by lowering the landing gear mechanism 86 located proximate the front of the tail trailer 13, disconnecting electrical and air cables 87, and disengaging the king-pin 33 from the fifth wheel 32 of the lead trailer 12.

The tractor 11, now carrying only the lead trailer 12 is backed towards the loading dock. Once the lead trailer 12 abuts the loading dock, the pneumatic locking pins 82 are disengaged. If the bunk 37 starts moving backwards down the incline of the chassis 36, the braking roller 94 engages the braking roller housing 95 to dissipate the energy of the bunk 37 so that the bunk 37 does not unintentionally move relative to the chassis 36.

The winch 74 is then operated to move the bunk 37 towards the rear of the lead trailer 12. The rearward cable 76 unwinds from the capstan 77 while the forward cable 75 winds around the capstan 77. Operation of the winch overcomes the friction between the braking roller 94 and the braking roller housing 95.

The bunk 37 moves on the top flanges 44 of the chassis beams 43 on load-bearing rollers 65 while the cam-follower guide wheels 69 guide the bunk 37 along the length of the chassis 36. The winch 74 is operated until the container 21 is adjacent the loading dock, and the floor of the cargo container 21 is horizontally coplanar with the floor of the loading dock.

The pneumatic locking pins 82 are then operated to engage apertures 84 to lock the bunk 37 in position relative to the chassis 36. FIG. 29 shows the lead trailer 12 with the cargo container 21 in the docking position. The cargo is then transported to and/or from the cargo container 21 by a forklift or some other loading/unloading means.

Upon completion of the loading/unloading operation, the pneumatic locking pins 82 are then disengaged. Again the bunk 37 does not move because the braking roller 94 engages the braking roller housing 95 to prevent backward movement of the bunk 37 on the chassis 36. The bunk 37 is then urged towards the front of the lead trailer 12 by the winch 74 until it is in the transport position again. The pneumatic locking pins 82 engage apertures 84 to hold the bunk 37 in position relative to the chassis 36.

If the weight of the cargo container 21 is not correctly distributed on the lead trailer 12 the bunk 37 can be moved backward or forward on the chassis 36 until the required distribution is achieved. The pneumatic locking pins 82 which engage apertures 84 will hold the bunk 37 in relative position to the chassis 36.

FIG. 29 illustrates the container 21 on bunk 37 in the docking position. As may be seen, the container is positioned at the rear of lead trailer 12 and is supported by wheels 38, if desired landing gear 39 may be lowered, and tractor 11 disconnected from trailer 12 by uncoupling the fifth wheel assembly 15. The bunk 37 is locked in docking position and no relative motion can occur between the container and the trailer unless pneumatic pressure is applied to the locking pins 82 and electrical energy is applied to the winch 77. The lead trailer 12 may not be moved of course until air pressure is supplied to the trailer brakes.

Thus there is disclosed in the present application a "B train" for carrying standard containers with both containers being dockable on their lead and tail trailers. While the present application discloses a preferred form of construction for the lead and tail trailers, it will be appreciated by those skilled in the art of trailer design that many different details may be varied from those illustrated. For example, in certain situations the lead trailer may be constructed to be used without a tail trailer. There would be no need for a second "fifth wheel" although a bunk for carrying the container would continue to be necessary for load distribution purposes. The triple axle at the rear of the trailer might also be replaced by a dual axle. The accompanying claims are therefor to be considered as defining the scope of the improvements of the present invention.

I claim:

1. A semi-trailer chassis adapted to carry a standard shipping container having rear doors, said chassis having a forward and a rear end, and comprising a pair of flat top beams extending longitudinally of said chassis to form the sides thereof and connected together by a series of lateral and diagonal members, a kingpin attached to said chassis at said forward end thereof for connection to a fifth wheel of a tractor, at least one axle assembly attached to said rear end of said chassis in a fixed location to support said rear end of said chassis, landing gear mounted intermediate said forward and rear ends of said chassis, a bunk having forward and rear ends mounted for longitudinal motion on said longitudinal beams between a first dockable position with the rear end of said bunk flush with the rear end of said chassis, and a plurality of transport positions with the rear end of said bunk forward of the rear end of said chassis, said bunk having means thereon for locking said container to said bunk, means mounted on said chassis for locking said bunk in said first dockable position with the rear doors of the container at the rear end of said chassis, and for locking said bunk in one of said plurality of predetermined transport positions forward of said first dockable position, said means for locking said bunk having a locked position and an unlocked position, and means for moving said bunk longitudinally of said chassis when said means for locking said bunk to said chassis is in said unlocked position, said means for moving said bunk comprising a winch mounted on said chassis intermediate the ends thereof, and cable means extending from said winch and connected to both the forward and rear ends of said bunk, rotation of said winch in one direction causing a rearward motion of said bunk and rotation of said winch in the opposite direction causing a forward motion of said bunk.

2. A semi-trailer chassis as claimed in claim 1, wherein said longitudinal beams have top surfaces, said bunk being carried on said top surfaces of said longitudinal beams by a plurality of load bearing rollers journalled to said bunk and in contact with the top surface of said beams.

3. A semi-trailer chassis as claimed in claim 1 wherein said means on said chassis for locking said bunk to said chassis comprises at least one pneumatically operated locking pin, fixed to one of said longitudinal beams and adapted to engage in one of a plurality of vertical slots formed in a side member of said bunk positions corresponding to said dockable and predetermined transport positions of said container on said chassis.

4. A semi-trailer chassis as claimed in claim 1 including means for braking the rearward motion of said bunk during rearward travel of said bunk.

5. A semi-trailer chassis as claimed in claim 1 and further comprising a second fifth wheel mounted between said longitudinal beams of said chassis at the rear thereof for connection to a kingpin of a second semi-trailer to form a "B train".

6. A semi-trailer chassis as claimed in claim 1 wherein the longitudinal beams have rearwardly sloping upper surfaces, said slope of said surfaces being in the range of from 3% to 5% when said semi-trailer chassis is connected to a tractor fifth wheel.

7. A "B train" combination comprising a semi-trailer chassis having a forward and rear end, a pair of flat top beams extending longitudinally of said chassis to form the sides thereof and connected together by a series of lateral and diagonal members, a kingpin attached to said chassis at said forward end thereof for connection to a fifth wheel of a tractor, at least one axle assembly attached to said rear end of said chassis in a fixed location to support said rear end of said chassis, landing gear mounted intermediate said forward and rear ends of said chassis, a bunk having forward and rear ends mounted for longitudinal motion on said longitudinal beams between a first dockable position with the rear end of said bunk flush with the rear end of said chassis, and a plurality of transport positions with the rear end of said bunk forward of the rear end of said chassis, said bunk having means thereon for locking said container to said bunk, means mounted on said chassis for locking said bunk in said first dockable position with the rear doors of the container at the rear end of said chassis, and for locking said bunk in one of said plurality of predetermined transport positions forward of said first dockable position, said means for locking said bunk having a locked position, and means for moving said bunk longitudinally of said chassis when said means for locking said bunk to said chassis is in said unlocked position, said means for moving said bunk comprising a winch mounted on said chassis intermediate the ends thereof, and cable means extending from said winch and connected to both the forward and rear ends of said bunk, rotation of said winch in one direction causing a rearward motion of said bunk and rotation of said winch in the opposite direction causing a forward motion of said bunk, a second fifth wheel mounted between said longitudinal beams of said chassis at the rear thereof for connection to a kingpin of a second semi-trailer to form a "B train," a tail trailer connected to said semi-trailer chassis by said second fifth wheel connection to form a "B train", said tail trailer having a chassis having a second pair of longitudinal beams forming the sides of said tail trailer chassis, said second pair of longitudinal beams having lower edges, a second kingpin mounted on a forward end of said tail trailer, said second kingpin being secured to a box having curved sides and said box extending below the lower edge of said second pair of longitudinal beams forming the sides of the chassis of said tail trailer, whereby said box is positioned between said longitudinal beams forming the sides of said semi-trailer chassis when said second kingpin is engaged with said second fifth wheel of said semi-trailer chassis, said box being dimensioned to permit articulation of said tail trailer without interference between said box and the longitudinal beams of said semi-trailer chassis.

8. The combination as claimed in claim 7 wherein said tail trailer has a slidable bogie at the rear thereof, whereby the axle loading of said semi-trailer chassis and said tail trailer may be varied by movement of said slidable bogie toward and away from the rear of said tail trailer.

9. The combination as claimed in claim 8 including locking means for locking said slidable bogie in a docking position in which the rear of said tail trailer may be abutted against a loading dock, and in at least one transport position in which said slidable bogie extends beyond the rear of said tail trailer.

* * * * *